(12) United States Patent
Laetz

(10) Patent No.: US 9,984,574 B2
(45) Date of Patent: May 29, 2018

(54) METHOD AND SYSTEM FOR ANTICIPATORY DEPLOYMENT OF AUTONOMOUSLY CONTROLLED VEHICLES

(71) Applicant: Tribal Rides, Inc., Sparks, NV (US)

(72) Inventor: Kurt R. Laetz, Sparks, NV (US)

(73) Assignee: Tribal Rides, Inc., Reno, NV (US)

( * ) Notice: Subject to any disclaimer, the term of this patent is extended or adjusted under 35 U.S.C. 154(b) by 323 days.

(21) Appl. No.: 14/601,167

(22) Filed: Jan. 20, 2015

(65) Prior Publication Data

US 2016/0209220 A1    Jul. 21, 2016

Related U.S. Application Data

(60) Provisional application No. 61/929,776, filed on Jan. 21, 2014.

(51) Int. Cl.
*G08G 1/00* (2006.01)

(52) U.S. Cl.
CPC .................................. *G08G 1/202* (2013.01)

(58) Field of Classification Search
None
See application file for complete search history.

(56) References Cited

U.S. PATENT DOCUMENTS

| | | | |
|---|---|---|---|
| 5,636,122 A * | 6/1997 | Shah ..................... | G01C 21/36 340/990 |
| 6,356,838 B1 | 3/2002 | Paul | |
| 6,697,730 B2 | 2/2004 | Dickerson | |
| 7,064,681 B2 | 6/2006 | Horstemeyer | |
| 7,479,901 B2 | 1/2009 | Horstemeyer | |
| 7,482,952 B2 | 1/2009 | Horstemeyer | |
| 7,538,691 B2 | 5/2009 | Horstemeyer | |
| 7,840,427 B2 | 11/2010 | O'Sullivan | |
| 2004/0260470 A1 * | 12/2004 | Rast ...................... | G06Q 10/06 701/300 |
| 2009/0030885 A1 | 1/2009 | DePasquale et al. | |
| 2009/0192851 A1 * | 7/2009 | Bishop ................... | G06Q 10/08 705/26.3 |
| 2009/0313077 A1 * | 12/2009 | Wheeler, IV ......... | G01C 21/26 705/7.14 |
| 2010/0228415 A1 | 9/2010 | Paul | |
| 2011/0059693 A1 | 3/2011 | O'Sullivan | |
| 2011/0313880 A1 | 12/2011 | Paul | |
| 2012/0130627 A1 * | 5/2012 | Islam .................... | G08G 1/202 701/300 |
| 2012/0239452 A1 | 9/2012 | Trivedi | |
| 2013/0132140 A1 | 5/2013 | Amin | |
| 2013/0132246 A1 | 5/2013 | Amin | |

(Continued)

*Primary Examiner* — James M McPherson
(74) *Attorney, Agent, or Firm* — Prasad IP, PC

(57) ABSTRACT

A method and system for management and anticipatory deployment of autonomously controlled vehicles are disclosed. According to one embodiment, a method may include calculating the geographic locations and periods of time where self-driving vehicles might experience the greatest probability of being requested to provide transportation services to passengers or cargo, and then communicating the resulting locations and times to self-driving vehicles, causing the vehicles to deploy themselves to those certain locations at those certain times, all prior to and in anticipation of specific requests being initiated by users or entities for such transport.

16 Claims, 12 Drawing Sheets

(56) References Cited

U.S. PATENT DOCUMENTS

| | | |
|---|---|---|
| 2013/0132887 A1 | 5/2013 | Amin |
| 2013/0204676 A1 | 8/2013 | Hindi |
| 2013/0246207 A1 | 9/2013 | Novak |
| 2013/0246301 A1 | 9/2013 | Radhakrishnan |
| 2014/0011521 A1 | 1/2014 | Hu |
| 2014/0011522 A1 | 1/2014 | Lin |
| 2014/0129135 A1 | 5/2014 | Holden |
| 2014/0129302 A1 | 5/2014 | Amin |
| 2014/0129951 A1 | 5/2014 | Amin |
| 2014/0172727 A1* | 6/2014 | Abhyanker ........ G06Q 30/0645 705/307 |
| 2016/0027307 A1* | 1/2016 | Abhyanker ............ G08G 1/005 701/117 |

* cited by examiner

METHOD AND SYSTEM FOR ANTICIPATORY DEPLOYMENT OF AUTONOMOUSLY CONTROLLED VEHICLES

RELATED APPLICATIONS

This application claims the benefit of provisional application No. 61/929,776 filed on Jan. 21, 2014.

FIELD OF THE INVENTION

This invention relates to logistical systems for managing the transportation of people and goods, and more specifically to a computer based system for the management of the deployment logistics of transportation resources for servicing human passengers and other cargo.

BACKGROUND

Autonomous vehicles that are capable of operation without human intervention are rapidly improving. As such vehicles are commercialized they will improve local transportation by providing greater functionality and allowing new methods and systems to be utilized for moving passengers and cargo. One such enabling-functionality is the ability of the vehicle to move from one location to another location while empty of any human. For transportation logistics this manifests itself as the attribute of being able to self-deploy, that is move from one user to the next user discontinuously and autonomously. This ability to self-deploy permits broad changes to occur in the methods and systems of local transportation. When self-deployable vehicles are commercialized, existing methods and systems of personal and commerce transportation will be utilized in new ways, and innovative new methods and systems of personal transportation and commerce will be developed. Multiple technologies ancillary to the self driving vehicle have been developed that are essential to the efficient operation of the transportation systems they may be used in, examples of which are shown in the following US patents and publications: communications (U.S. Pat. Nos. 7,064,681 6,697,730 7,482,952B2 US20110059693 US20130132887 US20140011521), tracking (U.S. Pat. Nos. 7,479,901 7,538,691 US20140129135), mapping, (U.S. Pat. No. 6,356,838), and specifically for technologies involved in the distribution logistics for managing the deployment of vehicles such as routing drivers and positioning of passengers (U.S. Pat. No. 6,356,838; US20110059693; US20120239452A1; US20130132140; U520130204676; US20140011522A1).

There is a need for improved systems and methods to enable greater utilization of self-driving vehicles. One method for optimizing system performance is through ride sharing, such as described in U.S. Pat. No. 7,840,427. However there remains a need for systems and methods that improve the cost and efficiency of self-driving vehicles. The economic benefits of such systems and methods in addition to the benefits self-driving vehicles promise to offer in safety, productivity, fuel consumption, and carbon emissions.

SUMMARY

Various embodiments of a method and system for anticipatory deployment of autonomously controlled vehicles are disclosed. As used herein, the terms "autonomously controlled", "self-driving", "self-deploying" and variants thereof when used in describing a vehicle refer to a vehicle with capabilities as specified in the National Highway Traffic Safety Administration (NHTSA) definitions for vehicle automation, and specifically Level 4 of the NHTSA definitions, "Full Self-Driving Automation (Level 4): The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles." *U.S. Department of Transportation Releases Policy on Automated Vehicle Development, NHTSA* 14-13, Thursday, May 30, 2013. Embodiments disclosed herein modify the foregoing definition by providing for the vehicle the destination or navigation input, which is determined in a manner as described herein.

According to one embodiment, calculating and then communicating data to a self-driving vehicle causing the vehicle to deploy itself to a certain location at a certain time, where the data has been calculated so that the vehicle might realize the greatest probability of being needed for providing transportation services to a passenger or cargo, all prior to and in anticipation of a specific request being initiated by any user or entity for such transport.

A system is further contemplated that in one embodiment may include a first and a second computer system. The first computer system may be configured to identify destination geographical areas and times to which to pre-deploy autonomously controlled vehicles. The second computer system may be configured to communicate with the first computer system via a network, with the second computer managing the dynamic flow of autonomously controlled vehicles as they carry passengers. As passengers arrive at destinations and vehicles become free of passengers, the first computer system may convey complete specifications of optimum anticipatory deployment instructions to the second computer system.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques. Specifically.

DETAILED DESCRIPTION

Figure 1A:
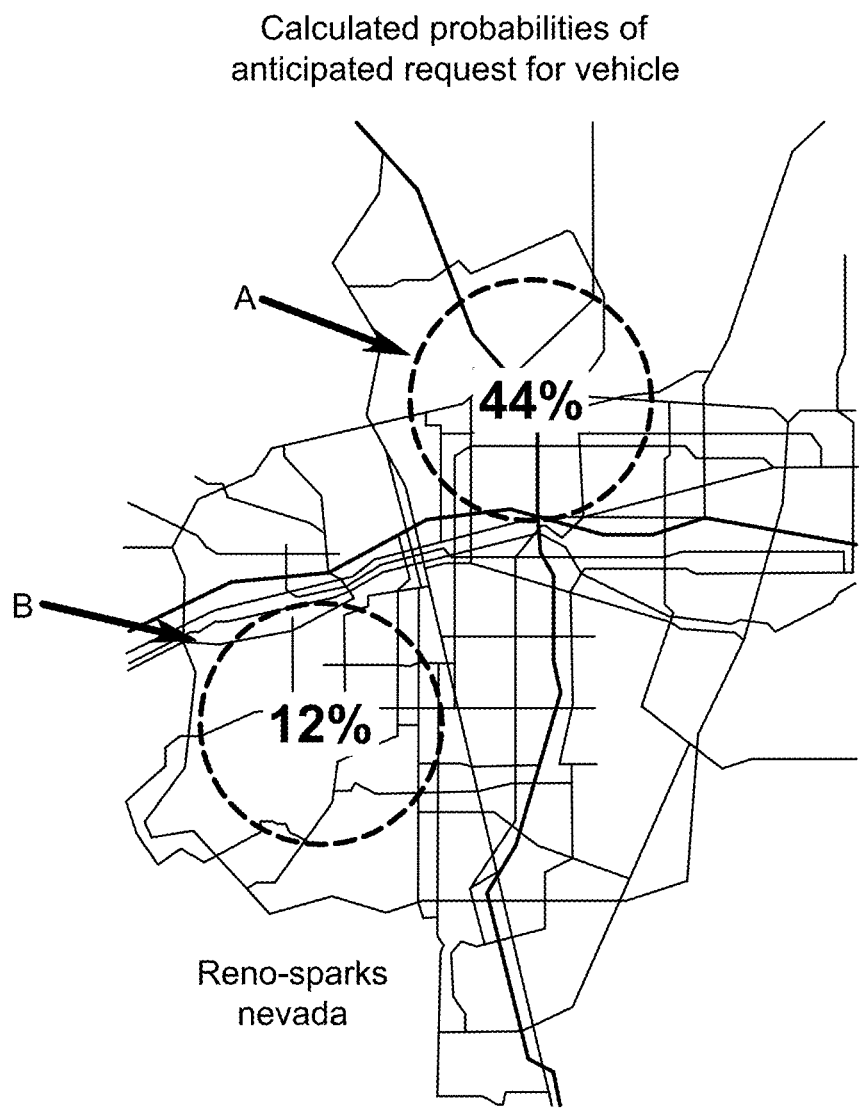
FIGS. 1(a) and 1(b) illustrate one embodiment of an anticipatory deployment system for self-driving vehicles by means of a computer generated matrix of anticipatory vehicle demand values calculated by probability by a computer and using a city street map and a grid pattern of some designs.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Computerized methods and systems are disclosed herein for delivering intelligently calculated logistical information to user(s) and owner(s) about where their self-deploying vehicle(s) should be anticipatorily deployed in order to better effectively serve the transportation needs of the user/owners. This is distinctly different from providing transportation services on demand to paying customers. Using heuristic logic in combination with other input data in order to determine the optimum anticipatory deployment of self-driving vehicles by their owners and fractional owners is a different and distinct technical approach than distributing for-hire taxis or limousines. Modeling location and time values to facilitate the positioning of vehicles most economically for anticipated future needs of owners, and, creating an on-line marketplace where owners choose among market generated transportation cost valuations is a novel technical approach that injects market pricing into the system, allowing for consumer choice amongst selected providers and thus driving system costs down.

Current on-demand services, such as fleet management systems employed for taxi and limousine fleets, typically utilize onboard metering devices, radios, and cell phones to dispatch drivers and monitor fares. Some companies have recently been developing on-line management systems and system components for processing user requests for transportation services and providing those services for a fee, where the management of the system occurs on a remote computer or computers and where users interface on mobile devices.

The technical methods and systems disclosed herein permit individuals and groups to plan and manage their use of self-deploying transportation services including: participating in an on-line auction for competitively pricing transportation services; utilizing transportation from individually-owned, shared-ownership, and fractionally-owned vehicles; joining multiple ownership groups as needed; collaborating on consumption behaviors with fellow user/owners to reduce costs; being immediately and tangibly financially rewarded for practicing behaviors that improve system performance; and participating in an online electronic commerce marketplace for accounting and payment. The result is a system that provides highly efficient and personalized transportation services that reduce cost by encouraging cost cutting behaviors, including financial rewards for cost cutting behaviors in the system, and by calculating anticipatory deployment data.

By way of example, three families can each own one self-deploying vehicle, and share ownership of a fourth self-deploying vehicle. This fourth vehicle they share amongst them as an on-demand transportation resource. Ownership of the fourth vehicle is held jointly by the three families, and each utilizes the fourth vehicle under terms they control. As a result of this system, when traveling locally each member of each family has access to their own self-deploying car and the jointly-owned fourth vehicle, increasing the likelihood that a vehicle will be available as needed and likely decreasing the distance the self-deploying vehicle travels between passengers. The terms "own", "owner" or "ownership" and other variants as used herein refer generally to any arrangement that permits usage of a vehicle, such as by holding title to the vehicle, or renting or leasing the vehicle.

The management of this method of self-deployment of fleets of self-driving vehicles provides for new economic efficiency to be realized. Computer modeling of historical data of transportation use and behaviors, and a multitude of other input variables is used to anticipate the transportation needs within a geographical area, and assign numerical probabilities of anticipated use needs by geographic location and time. By modeling these use patterns, groups of self-deploying vehicles can be anticipatorily deployed in such a manner as to increase the likelihood of being pre-positioned in closest proximity to where and when a user will need transportation services, thus lowering the delivery costs of providing these transportation services. Additional input variables may be used in the modeling for anticipatory deployment, including data on traffic, weather, human events, and other data regarding any such input variable as the system designers may deem relevant. A computer system that models customer behaviors to best predict where and when a customer is most likely to need transportation allows owners to pre-position their vehicles accordingly, thus reducing the amount of time and distance a vehicle must travel in order to get to the next user and thereby reducing the cost of operating the group of vehicles.

FIGS. 1(a-b) illustrate one embodiment of a method and system for an anticipatory deployment system for self driving vehicles by means of a computer generated matrix of anticipatory vehicle demand values calculated by probability by a computer and using a city street map and a grid pattern of some designs. Using the method and system depicted in FIGS. 1(a-b), a variety of historical data on trips taken by any user, including but not limited to times, routes, frequency, priority of importance to user, and other relevant preferences or variables, can be entered into a computer database and used to calculate future demand probabilities by location and time frames for that user. Groupings comprising any number of users can be created in one database and the data used to calculate a net-sum of probabilities by zone for the group that a trip will be initiated by an individual within any given zone (time and location), and self-deploying vehicles can be anticipatorily deployed accordingly. Such an algorithm may incorporate the use of weighted values and estimated values for any number of variables including but not limited to frequency of prior travel, and may be designed to optimize the efficiency of the system including cost.

Figure 1B:
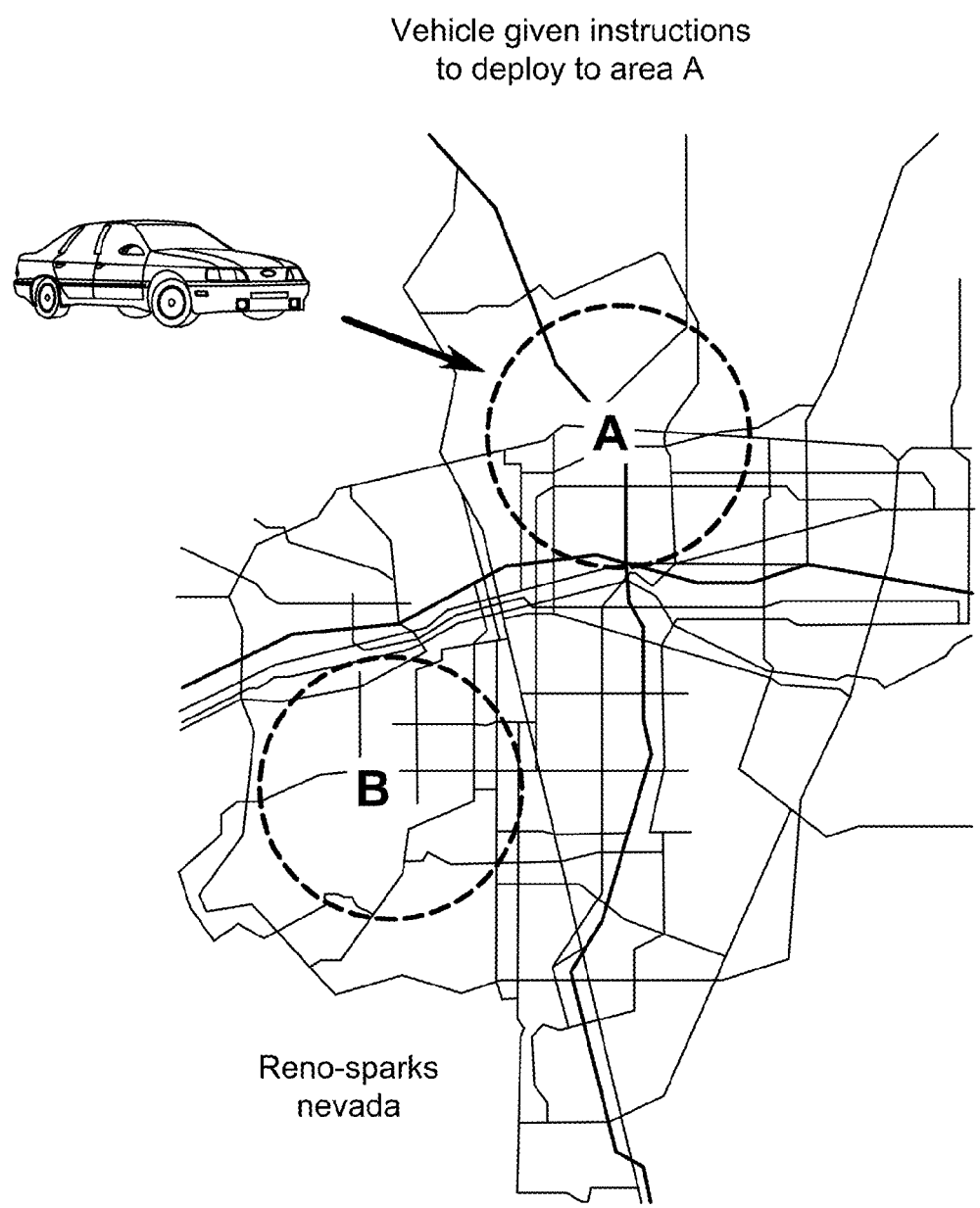

FIGS. 1(a-b) illustrate how probabilities that a vehicle might be requested for transportation will be calculated for sub-areas within a broader area so that a vehicle might be instructed to move closer in proximity to the area with the higher probability it will be needed so that vehicles are instructed to deploy to more efficiently serve anticipated needs. In the example of FIG. 1(a) area A represents an area where the calculated probability that someone will need transportation at 8:15pm is 44%. Area B represents an area where the calculated probability that someone will need transportation at 8:15pm is 12%. As seen in FIG. 1(b), since the probability of a user needing a self-deploying is higher in area A, a vehicle is anticipatorily deployed closer to Point A than to Point B, improving system efficiencies and lowering system costs.

Figure 2:
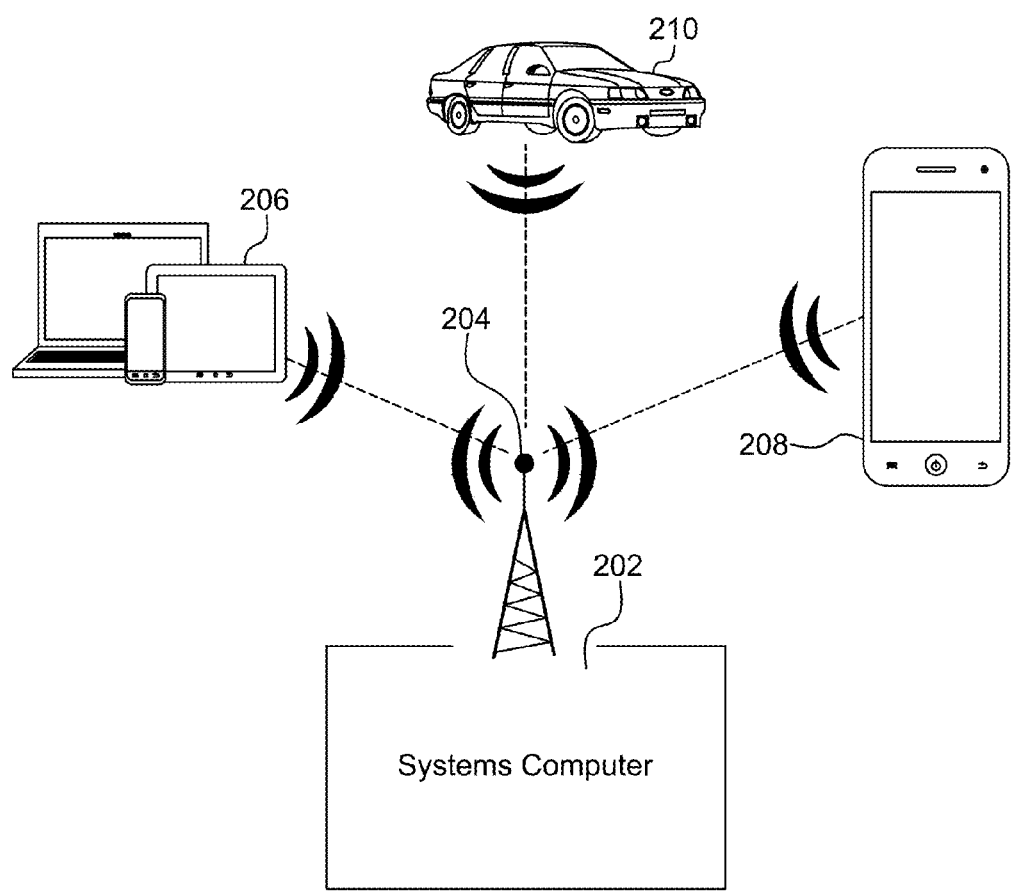
FIG. 2 illustrates a network of computers and communication devices that can be used to operate and execute an anticipatory deployment system.

FIG. 2 illustrates a network of computers and communication devices that can be used to operate and execute a method and system for the anticipatory deployment of vehicles. The network includes a systems computer 202 for calculating values, processing information, and issuing deployment instructions. The computer is illustrated generally and may take the form of a general-purpose computer or one with specially designed hardware. The computer 202 communicates securely and wirelessly with other system components via a wireless communication system shown generally at 204. Users of the system may interact and enter and receive data via a variety of computing devices including laptops or tablets such as shown at 206 or mobile devices such as shown at 208. The system also communicates with one or more self-deploying vehicles 210.

The methods and systems disclosed herein may include the creation of a matrix of values to enable the determination of the most efficient and cost effective locations and times for the deployment of self-deploying vehicles. The values represent the probability that a vehicle will be required at a particular place and time. The values may also represent economic efficiency of the system to reduce vehicle usage and/or cost to a particular user or to the system. The values may also represent vehicle capabilities and services, for example the values may indicate a preference or need for a limousine or a vehicle of a particular size or that has installed particular amenities such as a computer and screen, or a bar.

Figure 3A:
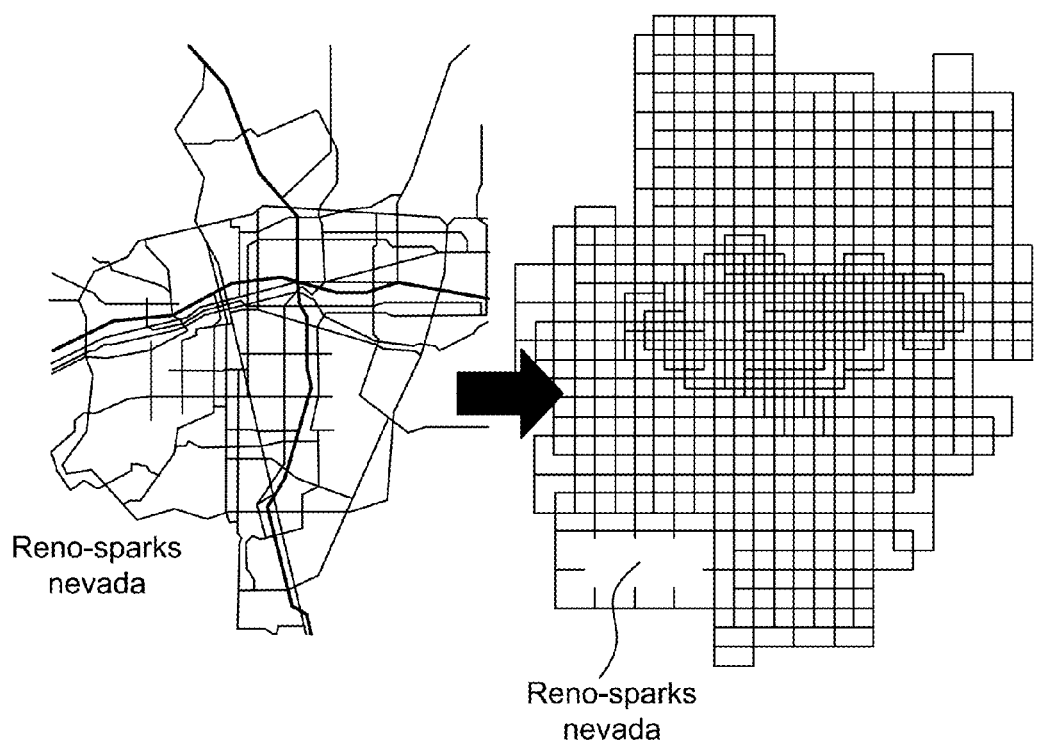
FIGS. 3(a), 3(b) and 3(c) illustrate how data on a user's trip can be stored within a three-dimensional matrix comprised of a specified area (square on the grid) at different specified times.
Figure 3B:
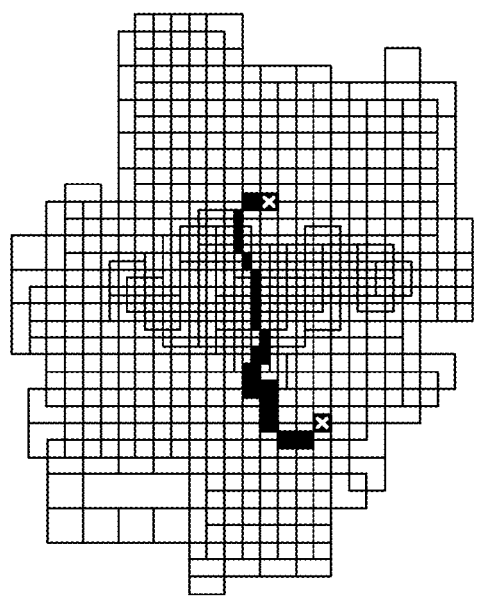
Figure 3C:
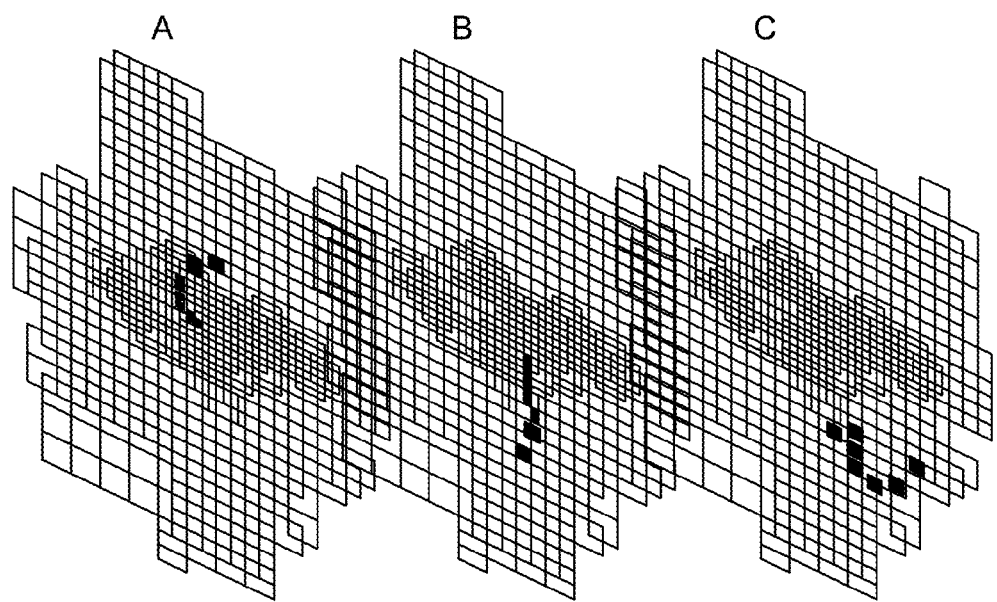

FIGS. 3(a-c) depict how a matrix of values is created by first dividing a physical area into sections, represented by the grids shown in FIGS. 3(a-c). FIG. 3(b) illustrates how an individual trip might be recorded as data within the sections and FIG. 3(c) illustrates how that data might be represented in a three-dimensional matrix when data on a trip is segregated by location and time, with data on any trip being recorded in multiple sections each representing a distinct time and location. As seen in FIG. 3(a), a pattern of area sectioning is created to overlay any physical area where any transportation routes are used. The physical area is divided into sections that are arranged in any manner and of any size. As seen in FIG. 3(b) data on individual trips through the physical area can be digitally stored as data within each section, including such data as time, travel direction, route, start and stop points, and other relevant information. A three-dimensional matrix of data contained within sections is created as shown in FIG. 3(c) by creating a new set of sections at regular time increments, so that a trip made by an individual through the physical space is digitally recorded in segments identifiable in both time and location.

Figure 4A:
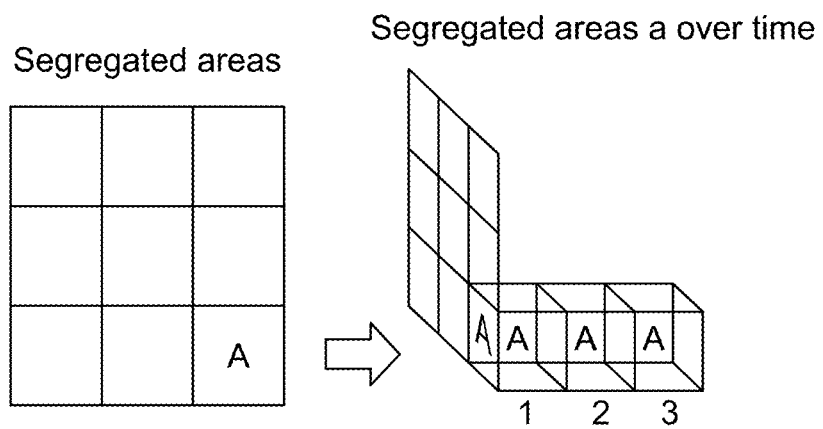
FIGS. 4(a) and 4(b) illustrate creation of a three-dimensional matrix of segregated areas by segregated times.
Figure 4B:
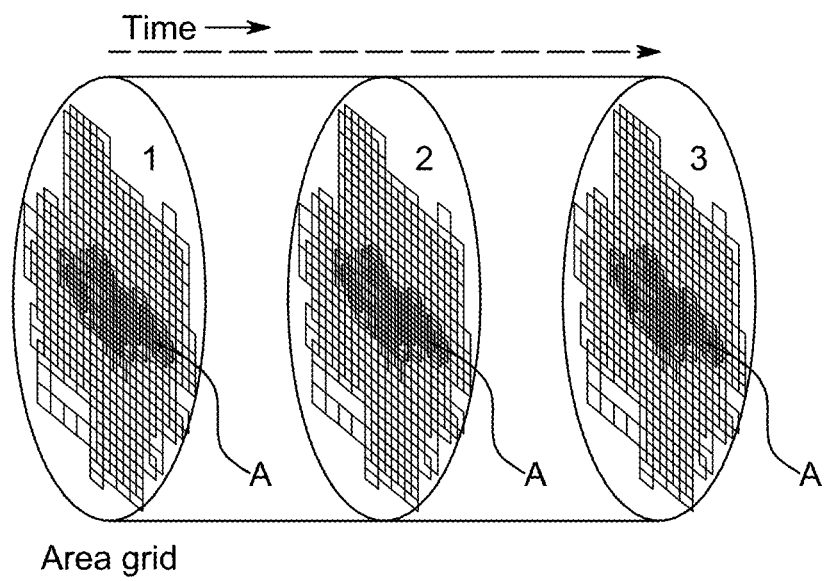

FIGS. 4(a-b) illustrate creation of a three dimensional matrix of segregated areas by segregated times. As seen in FIGS. 4(a-b) a set of segregated areas and a set of segregated times can be constructed into a three-dimensional matrix of area and time, where each segmented area can be assigned a unique coordinate, as illustrated area "A" can be represented at three separate times as coordinates A1, A2, and A3.

Figure 5A:
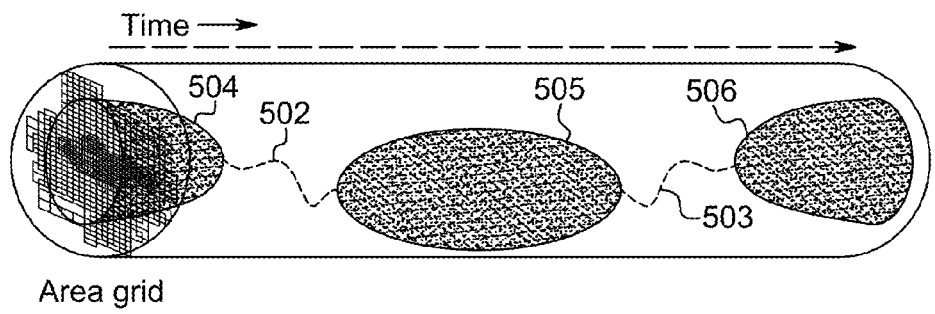
FIGS. 5(a), 5(b), 5(c) and 5(d) illustrate operation of one embodiment of an anticipatory deployment system for self driving vehicles where available vehicles are anticipatorily deployed based on anticipated user requests

The method and system depicted in FIGS. 3(a-c) allows a vehicle to be digitally mapped for travel while occupied, and, mapped for the times and locations where it is available for use. FIG. 5(a) is an illustration, employing the three dimensional matrix of area and time explained in connection with FIGS. 4(a-b). The illustration shown in FIG. 5(a) represents a 24-hour period where the dotted lines 502, 503 represent when and where a vehicle is traveling while occupied, and the ellipses 504, 505, 506 represent the times and locations when the vehicle is unoccupied and available for use. The three-dimensional ellipse shapes are representative of the area in which a vehicle is available, starting in one location and time (left side of the ellipse), and then expanding outward over a wider area as time progresses, and then contracting in area again as the time approaches the next location and time where the vehicle is scheduled to provide transportation (right edge of the ellipse). For example, the vehicle in the routes shown in FIG. 5(a) is available over an area that is fairly proximate to the end point of route 502 immediately following termination of route 502. As time passes, the vehicle is able to be available in a progressively larger area until the mid-point in time between the termination of route 502 and the initiation of route 503, at which point the area in which the vehicle is available gradually shrinks so that the vehicle is available at the initiation of route 503 at the designated starting point.

Figure 5B:
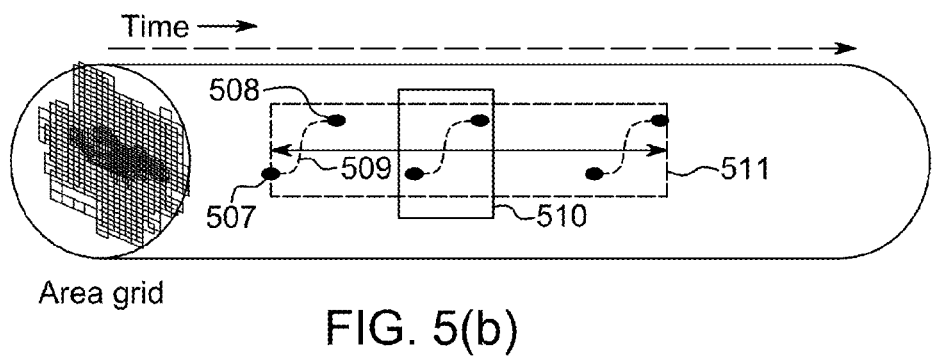

Using the same method of creating a matrix as depicted in FIGS. 3(a-c), as illustrated in FIG. 5(b), a user request for transportation services can be depicted as a starting point 507, an ending point 508, a route (dotted squiggly line 509), and a specific travel time (solid box 510) or a selected time window (dashed box 511) to travel.

Figure 5C:
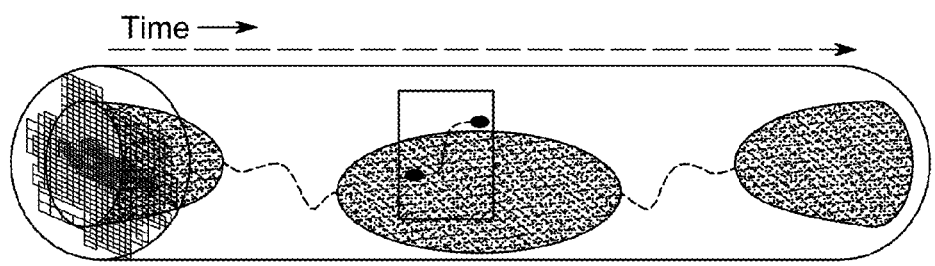
Figure 5D:
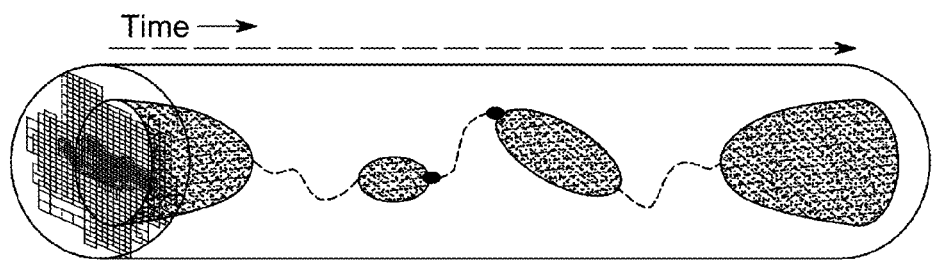

Performed by computer, any specific user travel request may be matched with any vehicle that is available, as illustrated by FIG. 5(c) showing a match. After a match has been made and the vehicle committed to the travel request, the system may calculate new values for the vehicle's availability as illustrated in FIG. 5(d), and these new values used to calculate new values for the anticipatory deployment of any other vehicles in the system. The system is dynamic so that when any user initiates the occupancy of a vehicle for a trip it may re-position other vehicles in the system. This could occur, for example, when a user (who belongs to owner group A and owner group B) secures a ride with a vehicle from group A. Since the probability of that user needing the same ride from group B would immediately drop to zero, and since the system knows this, the probability value for that user can be changed to zero in the matrix at group B, which might result in a group B vehicle moving to a better deployment location.

Figure 6A:
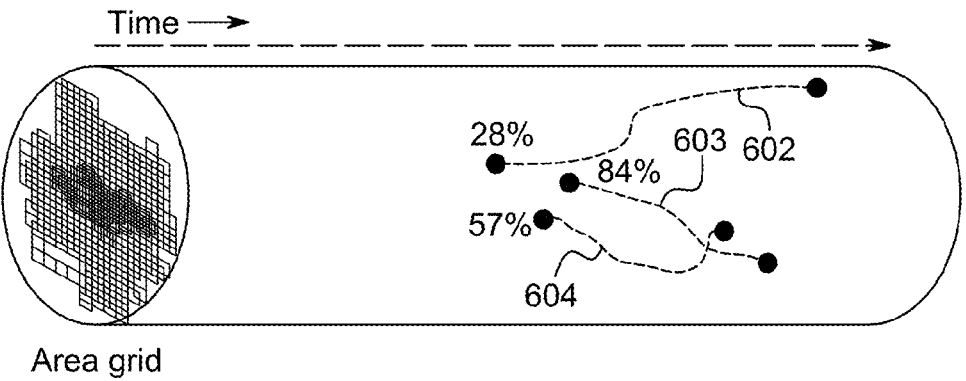
FIGS. 6(a), 6(b), 6(c) and 6(d) illustrate various deployment scenarios of a self-deploying vehicle in an anticipatory deployment system.

Using the system depicted in FIG. 3, historical data on user travel can be entered to construct a matrix of past travel data that can be used to calculate the probability of future service requests, as depicted visually in FIG. 6(a), where the lines 602, 603, 604 represent data entered on past travel and the values represent the probability that the trip will be requested based upon past frequency and other variables. As seen in FIG. 6(a), the probability of trip 602 being requested is 28%, the probability of trip 603 being requested is 84% and the probability of trip 604 being requested is 57%.

Figure 6B:
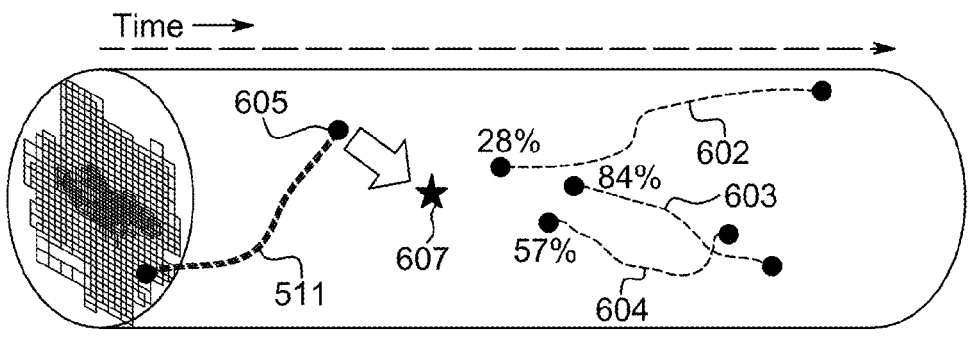

For any individual vehicle, when the vehicle reaches its end point of an occupied trip, the matrix of the probability of anticipated service requests as digitally constructed and as illustrated in FIG. 6(b) is used to instruct a self-deploying vehicle to deploy to a more system efficient location represented visually as the star. FIG. 6(b) depicts a self-deploying vehicle with an occupant where the systems computer 202 has calculated that the vehicle should relocate from endpoint 605 of the trip 606 to a different location at a particular time, shown at 607, in order to place the vehicle in a more efficient location and time to potentially serve requests the system anticipates for trips 602, 603 and 604. A self-deploying vehicle may be instructed to be anticipatorily deployed by the system from location 605 to location 607 to be located more proximately in time and location to trips 602, 603 and 604 that may be requested by a user of the system.

Figure 6C:
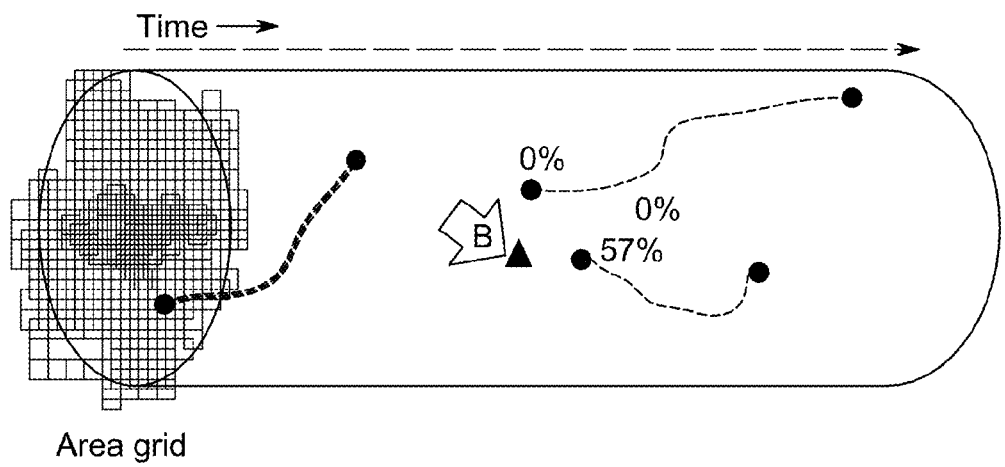

FIG. 6(c) illustrates a self-deploying vehicle being deployed in one location, and then deployed to different position when a change in a data variable causes a change in the value of the potentiality of anticipated user requests. Autonomously driven vehicles can be provided with anticipatory deployment instructions so as to arrive within proximity to any zone based upon calculations that include any number of variables (as may be defined by the system designers, programmers, and users of any system, or, in response to a user request, or, user or group profile and settings, or, any other variable). In the illustration seen in FIG. 6(c) a self-deploying vehicle is visualized being deployed in one location, and then deployed to different position when a change in a data variable causes a change in the value of the potentiality of anticipated user requests. Such anticipatory deployment adjustments might be caused by any variation in the data used to calculate a current deployment, including but not limited to:

a. The value of transportation services based upon the fractional cost of ownership and the direct variable costs for each rider on every trip.
b. User's preferences, individually or collectively, the preferences to include the type and kind of transportation, the level of social interaction and privacy.
c. Current and anticipated human and natural events to predict demand for services, including weather events, sporting events, normal commuting, and any other event that may affect demand.
d. Routing data obtained from user defined routing data generated through a user interface on a digital media including user defined routing data created to facilitate route preferences, ride sharing, flexible scheduling, and other user services.

Figure 6D:
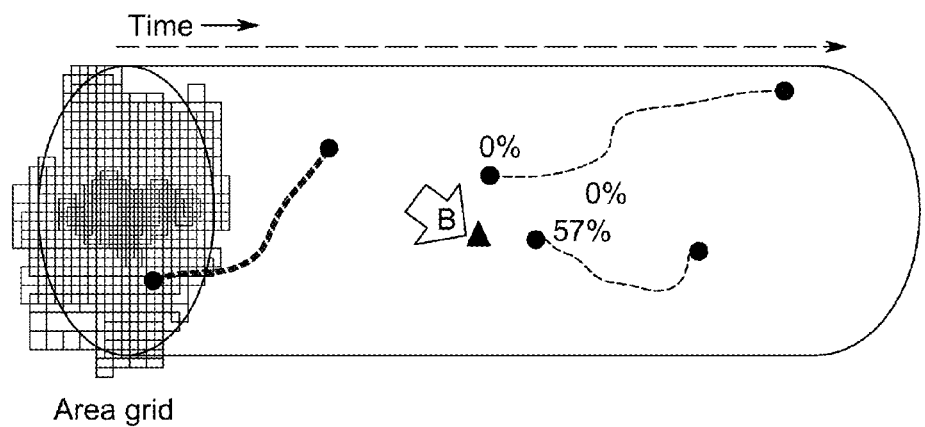

FIG. 6(d) illustrates anticipatory deployment being changed when the optimum distribution of autonomously driven vehicles is determined by factoring in pricing data and analyzing one or more business variables comprises determining a cost, where the dashed lines with associated probability values represent anticipated trips that had negative value changes in their variables.

In the illustration seen in FIG. 6(d) the anticipatory deployment is visualized being changed when the optimum distribution of autonomously driven vehicles is determined by factoring in pricing data and analyzing one or more business variables comprises determining a cost, and where two values have been recalculated to zero reflecting negative changes in their variables.

Figure 7:
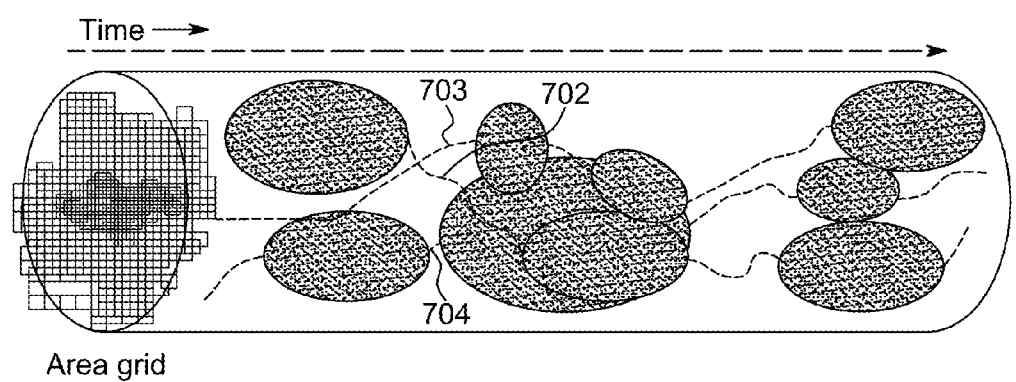
FIG. 7 illustrates an example of multiple vehicles in an anticipatory deployment system.

A computerized system servicing any number of users and managing any number of autonomously driven vehicles can match users to vehicles using any of a multitude of selection criteria as defined by the system designers, users, and vehicle owners, including but not limited to; departure and arrival times, routes, type of vehicle, ride sharing, and any other criteria. FIG. 7 illustrates an example comprising multiple users and multiple vehicles. In this illustration, the routes of three vehicles are shown over a 24 hour period, with ten routes, portions of which are shown at 702, 703, 704 where the vehicles are providing transportation (represented by the dashed lines such as 702, 703, 704), and nine periods and locations where the vehicles are stationary and are available to other users (represented by the elliptical shapes).

Figure 8:
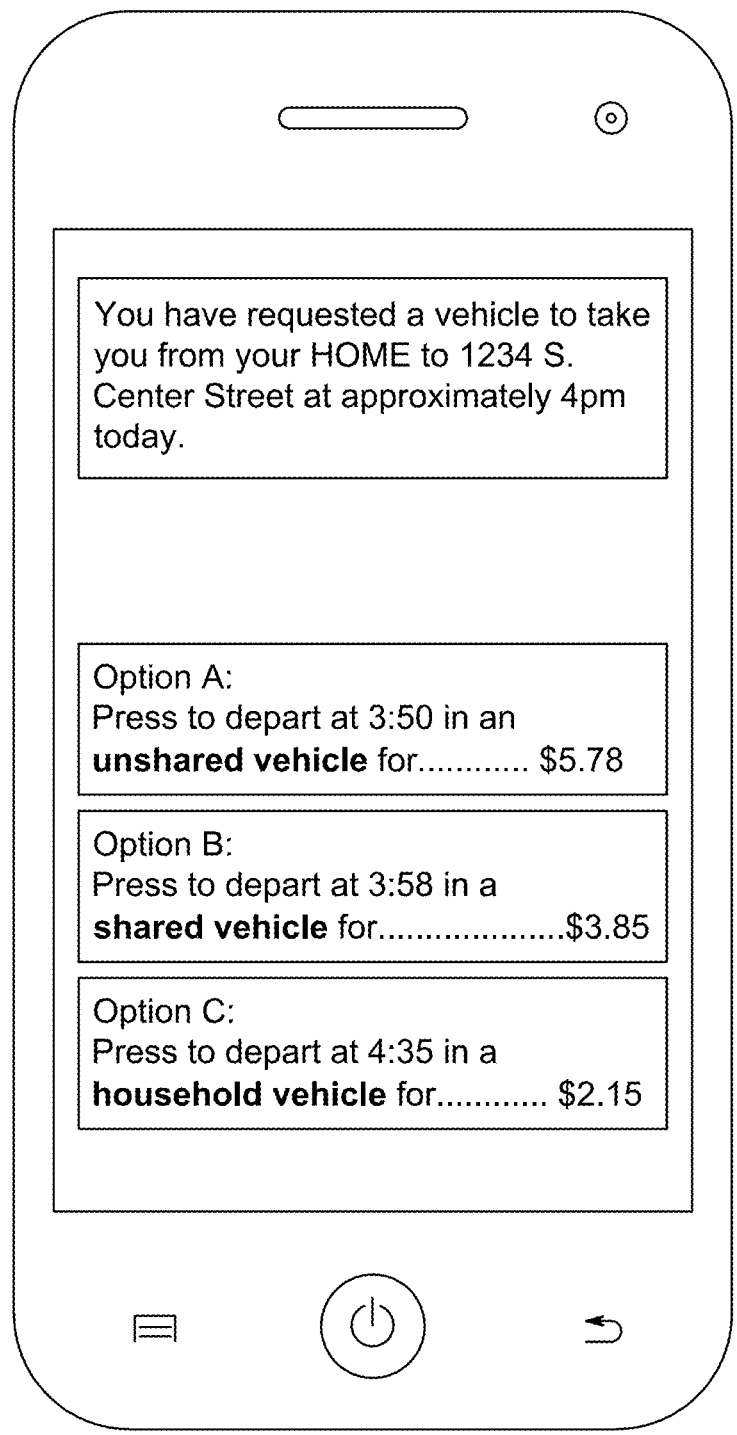
FIG. 8 illustrates an example user interface on a mobile device in an anticipatory deployment system.

FIG. 8 illustrates the system response that may be generated to a user after the user has submitted a request for transportation services to the system. The system has calculated best matches to fulfill the user request using vehicles available based upon the groups the user is an owner/member of. The matches reflect the availability of vehicles that match the time, route, personal preferences, and other search criteria, and the user is presented with a cost and service selection for the trip.

Figure 9A:
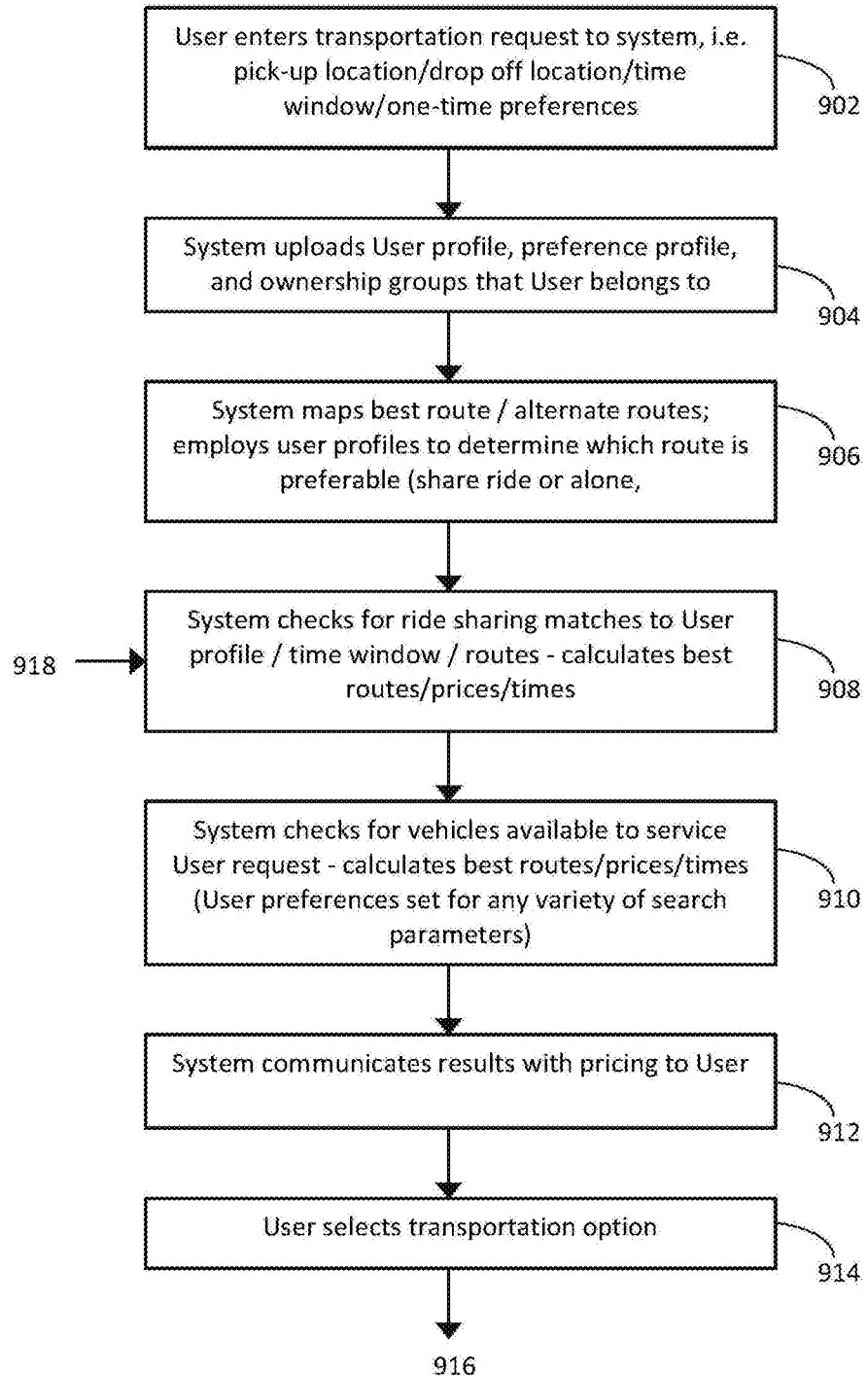
FIGS. 9(a) and 9(b) illustrate a flow chart showing a process that is used when a user interacts in an anticipatory deployment system.
Figure 9B:
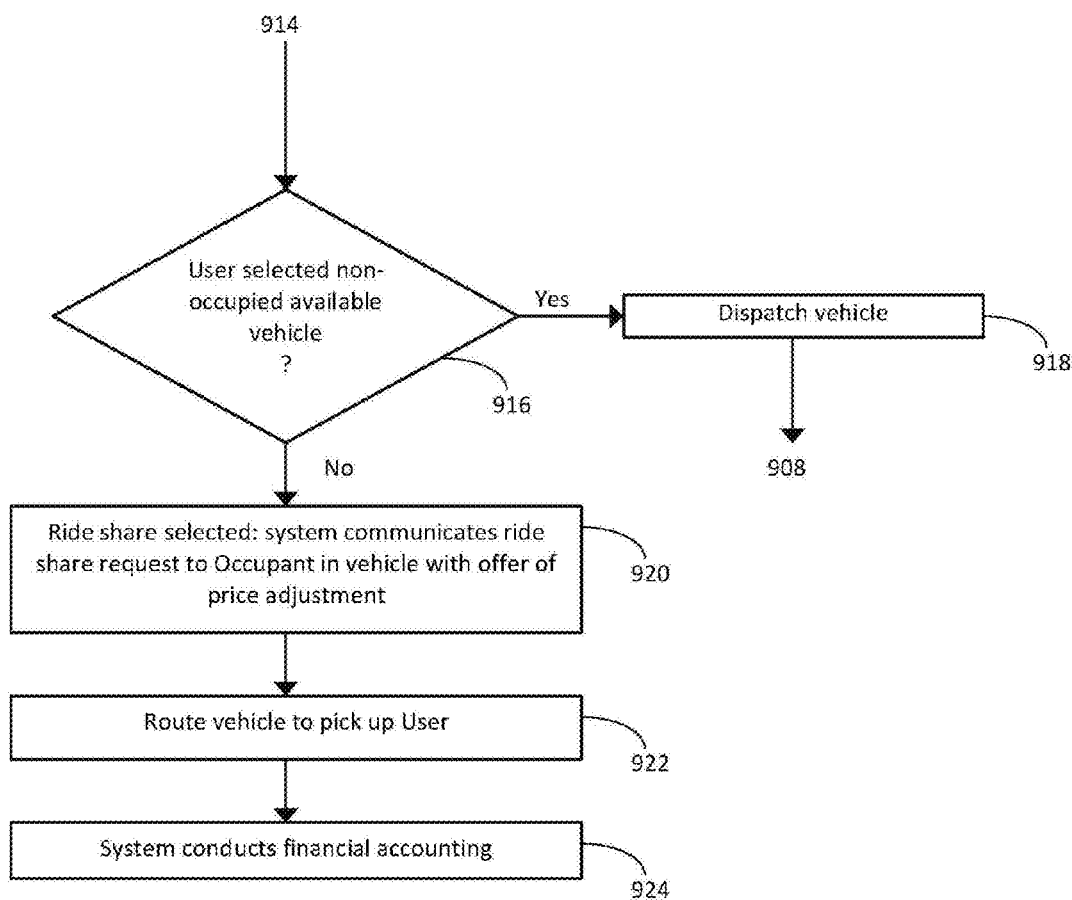

FIGS. 9(a-b) illustrate operation of the anticipatory deployment system in response to certain user commands. In the flowchart shown in FIGS. 9(a-b), users may interface with other users on other electronic devices to collaborate on their shared use of vehicles in any manner where the collaboration can include ride sharing, schedule adjusting, route adjusting, and any other method of modifying a travel event as a means to facilitate the more efficient and cost effective anticipatory deployment of autonomously controlled vehicles.

The method and system as described by the flow chart seen in FIGS. 9(a-b) provides optimum distribution of autonomously driven vehicles, determined by factoring in pricing data obtained through any manner of on-line, live, electronic marketplace, where the bidding for services occurs between buyers and sellers. This includes any manner of matching buy and sell offers for services, and, factoring in pricing to include using real time pricing data generated from an electronic marketplace, to adjust the distribution of the vehicles in any manner, including to effect financial results.

At step 902, a user enters a transportation request to the system, for example, pick-up or drop-off at a specified location, within a specified time window. "One-time preferences" are any trip specific requests or variations from user profiles that the user requests for a trip. Example: most commonly you would assume people would like to shut off the "will share a ride" preference on a trip for some personal reason. This way they won't be bothered by "will you share your ride" requests for that trip. The system retrieves at step 904, information pertaining to the user such as a user profile, a preference profile and the ownership groups that the user belongs to. Examples of User Profile variables include: (1) will you share your ride?; (2) who in your groups will you share with and who will you exclude?; (3) what kind of transportation are you looking to use; comfort, amenities, price?; (4) what are your favorite routes?.

The system then, step 906, determines the optimum route and a plurality of alternate routes. Optimum route means the best match for all of the variables (but especially price &, ride sharing), and, alternate choices based upon one variable being weighed more heavily. Example: choice A means leaving on time but paying $10 vs. alternate choice B means waiting 15 minutes but only paying $5. At step 908, the system checks for ride sharing matches. The optimum and alternate routes determined for one user are compared to optimum and alternate routes determined for other users to identify overlaps, taking into account preferences for times and locations, and other variables specified by the users in question to calculate the routes and times that best match the user specified needs within the system constraints. System constraints include the number and size of the vehicles available in the groups of which the users of interest are members. At step 910, the system checks for vehicles available to service the requests in question and generates routes, which include start and end locations and path between the start and end locations, and times along with price, the price being the currency amount the program calculates as being attributed to a certain transportation option, which might be calculated to include direct and indirect costs and costs attributable to user preferences such as, ride-sharing vs. riding alone, amenities in the vehicle such as entertainment features, the time the trip is initiated, the type of vehicle, user requested variations to the route, and other costs the designers and operators of the system might choose to include. The system at step 912 provides to the user the transportation options that are available. The user at step 914 selects whether they are willing to share a ride. The system at 916 determines the user's response and at 918 responds by identifying and dispatching a vehicle for routing to the user if the user selects a non-occupied vehicle and then returns to step 908. If the user wishes to share a vehicle on the route in question with any other users, the system at step 920 communicates the ride share request to the occupant(s) in the vehicle along with an offer of a price adjustment. If the offer is accepted by the occupant(s) the system at 922 routes the vehicle to pick up the user. Finally, at step 924 the system generates a financial accounting based upon the cost variables the system designers and operators have selected.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system for deploying autonomously controlled vehicles, comprising:
    a database for storing profiles of users of the system, the profiles comprising information regarding a plurality of user preferences, and user travel history;
    a vehicle deployment module for causing anticipatory deployment of the autonomously controlled vehicles by determining routes of the vehicles as a function of the profiles to generate vehicle control information to define routes, each route including a start point and an end point, and a time corresponding to each start point and end point, wherein the vehicle deployment module determines routes of the vehicles by:
        retrieving travel history of one or more users of the system from the database, the travel history comprising data values representing start and end locations, associated times, and routes of travel by the one or more users of the system; and
        generating a matrix of anticipatory vehicle demand values calculated as a function of each travel history that has been retrieved;
    wherein each start point, and time corresponding to the start point, of each deployed vehicle is generated as function of time and location with respect to an anticipated usage of the deployed vehicle; and
    a communications module for causing the vehicle control information to be transmitted to the deployed vehicle, the vehicle control information comprising the start point and the end point and the time corresponding to the start point and the end point for the deployed vehicle, and the vehicle control information causing the vehicle to pre-deploy based on anticipated requests for transportation services.

2. The computer system of claim 1 wherein the information regarding a plurality of user preferences comprises:
    information pertaining to ride sharing preferences;
    information pertaining to vehicle preferences;
    information pertaining to price preferences; and
    information pertaining to route preferences.

3. The computer system of claim 1 wherein the vehicle deployment module:
    generates groupings for the users of the system corresponding to travel history that has been retrieved; and
    calculates a net-sum of probabilities by geographical zone for each of the groupings that indicates probability that a trip will be initiated by a user of the system within any given time, geographical zone and location.

4. The computer system of claim 1 wherein the vehicle control information further comprises route preference information.

5. The computer system of claim 1 wherein the travel history is generated by determining the start and end locations from mapping data and recording movement of each vehicle at time intervals to generate three-dimensional data comprising positional data in two dimensions and time in a third dimension.

6. A computer system for deploying autonomously controlled vehicles, comprising:
    a database for storing profiles of users of the system, the profiles comprising information regarding a plurality of user preferences, and user travel history;
    a vehicle deployment module for causing anticipatory deployment of the autonomously controlled vehicles by determining routes of the vehicles as a function of the profiles to generate vehicle control information to define routes by determining geographical locations and times of day for which users of the system will request transportation services, as a function of multiple variables that indicate one or more geographic locations and times where a highest probability exists that the users will require transportation services, each route including a start point and an end point, and a time corresponding to each start point and end point,
    wherein determining the geographical locations and times of day for which users of the system will request transportation services comprises:
        determining for each user in a group of users of the system, locations and times where each user will require transportation services to generate user location/time data, for each user in the group of users, indicative of locations and times of future requests for transportation services;
        tabulating the user location/time data for each user in the group of users, to generate a probability value associated with the user location/time data for each user in the group of users, the probability indicative of future requests for transportation services;
modifying each probability value as a function of a plurality of weighted variables, to modify prediction of requests for transportation services at a location and time by each user in the group, and
performing heuristic calculations to modify the probability value for each user in the group;
wherein each start point, and time corresponding to the start point, of each deployed vehicle is generated as function of time and location to an anticipated usage of the deployed vehicle; and
a communications module for causing the vehicle control information to be transmitted to the deployed vehicle, the vehicle control information comprising the start point and end point, and a time corresponding to the start point and the end point for the deployed vehicle, and the vehicle control information causing the deployed vehicle to pre-deploy based on anticipated requests for transportation services.

7. The computer system of claim 6, wherein determining for each user in a group of users of the system, locations and times where the user will require transportation services to generate user location/time data comprises:
obtaining collaboration data pertaining to shared use preferences by the users via an electronic device, the shared use preferences including data preferences selected from the group consisting of ride sharing preferences, schedule adjusting preferences, and route adjusting preferences.

8. A computer system for deploying autonomously controlled vehicles, comprising:
a database for storing profiles of users of the system, the profiles comprising information regarding a plurality of user preferences, and user travel history;
a vehicle deployment module for causing anticipatory deployment of the vehicles by determining routes of the vehicles as a function of the profiles to generate vehicle control information to define routes, each route including a start point and an end point, and a time corresponding to each start and end point,
wherein the start point, and time corresponding to the start point, of each deployed vehicle is a function of time and location to an anticipated usage of the deployed vehicle; and
a communications module for causing the vehicle control information to be transmitted to the vehicles, the vehicle control information comprising the start and end points and the time corresponding to each start and end point for the corresponding vehicle;
wherein the vehicle deployment module determines routes of the vehicles by:
determining geographical locations and times of day where users of the system, that request transportation services, will require transportation services, by generating a dynamic forward looking matrix of values for anticipated requests for the transportation services at different times and locations so that autonomous vehicles responsive to the computer system are dynamically positioned to service the requests being anticipated; and
generating vehicle control information as a function of the matrix of values;
wherein the vehicle control information causes the vehicles to pre-deploy based on anticipated requests for transportation services.

9. The computer system of claim 8, wherein the matrix of values is further generated as a function of type and kind of vehicle, level of social interaction and privacy desired, price and routes.

10. A computer system for enabling deployment of autonomously controlled vehicles in a manner that anticipates time and location at which vehicles within a vehicle fleet will be needed by one or more users, comprising:
a database for storing profiles of users of the system, the profiles comprising information regarding a plurality of user preferences, and user travel history;
a vehicle deployment module that retrieves from the database selected user travel history and selected user preferences and calculates as a function of the user travel history and user preferences that are retrieved, geographical locations and times of day where users that request transportation services will require the transportation services; and
a communications module, responsive to the vehicle deployment module, that causes transmission of vehicle control information to cause selected vehicles in the vehicle fleet to be pre-deployed as a function of time and location to those users requesting transportation services;
wherein the vehicle deployment module responds to a vehicle being committed to a travel request by a user of the one or more users by modifying availability information for the vehicle being committed to the travel request and by recalculating deployment locations and times for other vehicles in the vehicle fleet.

11. The computer system of claim 10 wherein the profiles further comprise group information that causes a user to be treated by the computer system as a member of one or more groups as indicated by the group information, and wherein the vehicle deployment module causes only vehicles associated with a group in which a user is a member to be deployed for the user.

12. The computer system of claim 10 wherein the vehicle deployment module responds to a vehicle completing a trip associated with a travel request by a user by modifying availability information for the vehicle being completing the travel request and by recalculating deployment locations and times for other vehicles in the vehicle fleet.

13. The computer system of claim 12 wherein the vehicle deployment module responds to a change in a travel request by a user by recalculating deployment locations and times for vehicles in the vehicle fleet.

14. The computer system of claim 10 wherein the profiles further comprise group information that causes a user of the one or more users to be treated by the computer system as a member of one or more groups as indicated by the group information,
wherein the vehicle deployment module causes only vehicles associated with a group in which a user is a member to be deployed for the user, and
wherein the vehicle deployment module responds to a vehicle being committed to a travel request by a user who is a member of a first group and a second group by deploying a vehicle associated with the first group for the user,
modifying availability information for the vehicles associated with the first and the second groups, and
recalculating deployment locations and times for vehicles in accordance with the modified availability information.

15. A computer system for enabling deployment of autonomously controlled vehicles in a manner that anticipates time and location at which vehicles within a vehicle fleet will be needed by one or more users of the system, comprising:

a database for storing profiles of users of the system, the profiles comprising information regarding a plurality of user preferences, and user travel history, wherein each user of the system is associated with one or more user groups and wherein each vehicle in the vehicle fleet is associated with a single group of the user groups;

a vehicle deployment module that retrieves from the database, user travel history and user preferences;

calculates, as a function of the user travel history and user preferences that are retrieved, deployment times and locations of each vehicle in the vehicle fleet in accordance with historical travel information indicated by the user travel history and existing user travel requests entered by users of the system; and recalculates upon initiation and termination of deployment of a vehicle for a user of the system that requests a ride, subsequent deployment times locations of the vehicle and of all other vehicles in the groups with which the user of the system that requests a ride is associated; and a communications module that causes transmission of vehicle control information to vehicles in the vehicle fleet to cause vehicles to be anticipatorily deployed in accordance with times and locations determined by the vehicle deployment module such that the deployed vehicles are deployed as a function of time and location with respect to users of the system requesting transportation services.

16. The computer system of claim 15 wherein the vehicle deployment module further calculates deployment times and locations of each vehicle in the vehicle fleet in accordance with capabilities of each vehicle.

* * * * *